(12) United States Patent
Appellof et al.

(10) Patent No.: US 8,032,491 B1
(45) Date of Patent: Oct. 4, 2011

(54) ENCAPSULATING INFORMATION IN A STORAGE FORMAT SUITABLE FOR BACKUP AND RESTORE

(75) Inventors: Carl J. Appellof, Arroyo Grande, CA (US); Russell Monckton, Longwood, FL (US); Anthony T. Orling, San Luis Obispo, CA (US)

(73) Assignee: Symantec Operating Corporation, Mountain View, CA (US)

( * ) Notice: Subject to any disclaimer, the term of this patent is extended or adjusted under 35 U.S.C. 154(b) by 1502 days.

(21) Appl. No.: 11/197,266

(22) Filed: Aug. 4, 2005

Related U.S. Application Data

(60) Provisional application No. 60/674,224, filed on Apr. 22, 2005.

(51) Int. Cl.
*G06F 7/00* (2006.01)
(52) U.S. Cl. ........................................ 707/649; 707/655
(58) Field of Classification Search ........................ None
See application file for complete search history.

(56) References Cited

U.S. PATENT DOCUMENTS

2003/0225733 A1* 12/2003 Rhodes .............................. 707/1
2005/0222969 A1* 10/2005 Yip et al. .......................... 707/1

OTHER PUBLICATIONS

"VERITAS Backup ExecTM 10 for Windows Servers; Agent for Microsoft Exchange Server", Whitepaper, VERITAS Software Corporation, Jan. 18, 2005.
"VERITAS Backup ExecTM 9.1 for Windows Small Business Server"; VERITAS Software Corporation, Nov. 11, 2003.

* cited by examiner

*Primary Examiner* — Cam Y T Truong
(74) *Attorney, Agent, or Firm* — Rory D. Rankin; Meyertons, Hood, Kivlin, Kowert & Goetzel, P.C.

(57) ABSTRACT

A system for encapsulating configuration information in storage objects formatted for backup and restore comprises a processor coupled to a memory, where the memory stores instructions executable by the processor to implement a backup manager configured to generate backup versions of a plurality of storage objects (such as files or directories) of a source data set of a primary host. The backup manager may be configured to create an additional storage object that includes information collected from a designated information source in a first format, store the additional storage object within the source data set in a second format, and generate a backup version of the additional storage object.

23 Claims, 6 Drawing Sheets

ENCAPSULATING INFORMATION IN A STORAGE FORMAT SUITABLE FOR BACKUP AND RESTORE

This application claims the benefit of U.S. provisional patent application Ser. No. 60/674,224, entitled "Advanced Techniques For Data Protection And Restoration", filed Apr. 22, 2005.

BACKGROUND OF THE INVENTION

1. Field of the Invention

This invention relates to computer systems and, more particularly, to backup and restoration of data within computer systems.

2. Description of the Related Art

Many business organizations and governmental entities rely upon applications that access large amounts of data, often exceeding many terabytes of data, for mission-critical applications. Numerous different types of storage devices, potentially from multiple storage vendors, with varying functionality, performance and availability characteristics, may be employed in such environments.

Any one of a variety of factors, such as system crashes, hardware storage device failures, software defects, or user errors (e.g., an inadvertent deletion of a file) may potentially lead to data corruption or to a loss of critical data in such environments. In order to recover from such failures, various kinds of backup techniques may be employed. For example, in some storage environments, file-level replication may be employed, where a complete copy of the set of files in one or more file systems at a primary host may be created at a secondary host. If the primary host fails, or if the file system at the primary host becomes corrupted or unavailable, the files may be recovered or restored by copying from the replica.

However, simply restoring contents of storage objects such as files or directories may be insufficient for a desired level of recovery from certain types of failures. For example, if a primary host whose files are backed up by a file replication mechanism fails, users may desire that the configuration state of the primary host also be restored, along with the file data. Unfortunately, some types of system configuration information, as well as other information appropriate for backup such as application-generated or user-supplied information, may not typically be available or stored in a format recognized by the replication mechanism, and as a result, may not typically be backed up along with the storage object data. For example, in storage environments employing file-based replication as the backup mechanism, configuration information related to network-based file shares may not be stored in a file format accessible to the file replication engine, and various elements of system state information may also be stored in data structures other than files, or may have to be collected from portions of several files. Requiring separate backup mechanisms to be implemented for different sources of configuration information and any other non-file structured information that may be needed for restoration may not be a cost-effective solution in many storage environments. In addition, in some storage environments, especially environments where disk-based backups are implemented, transparent access to some or all of the backup versions of storage objects may be provided to end users. That is, end users may be permitted to access backup versions of storage objects directly, without administrative intervention. In such environments, when accessing the backup versions, some end users may expect to make use of configuration settings (such as file share settings) similar to those of the primary host.

SUMMARY

Various embodiments of systems and methods for encapsulating configuration information in storage objects formatted for backup and restore are disclosed. According to one embodiment, a system comprises a processor coupled to a memory, where the memory stores instructions executable by the processor to implement a backup manager configured to generate backup versions of a plurality of storage objects (such as files or directories) of a source data set of a primary host. The backup manager may be configured to create an additional storage object that includes information collected from a designated information source in a first format, to store the additional storage object within the source data set in a second format, and to generate a backup version of the additional storage object. The information may be collected from a variety of information sources in different embodiments, such as providers of configuration information associated with the primary host, applications such as e-mail servers, database management applications, etc., or user interfaces that may allow users to supply arbitrary data for backup. For example, in one embodiment the backup manager may be configured to use a replication engine to create backup versions, where the replication engine may be configured to replicate storage objects of a particular type (e.g., files), but may not be capable of generating backup versions of objects that are not stored in file format. In such an embodiment, the backup manager may be configured to gather non-file structured information from a variety of information sources, using interfaces such as system calls, queries to networking or other databases, etc., into the additional storage object, and to store the additional storage object in file format, so that the replication engine may recognize and replicate the collected configuration information. Using such a technique, important information that may be useful for restoration may be protected using an existing backup mechanism (e.g., without requiring new types of backup mechanisms to be implemented) instead of being lost, for example, because it was not initially stored in a format understood by the backup mechanism.

In one embodiment, the backup manager may be configured to create the additional storage object in response to a detection of a triggering condition, such as a change to configuration information at the primary host. In some implementations of such embodiments, the backup manager may be configured to monitor one or more sources of configuration information for changes. Various types of configuration information may be included within the additional storage objects in different embodiments, such as network file share information, system state information (some of which may be needed for booting and/or initializing a primary host), any desired system registry keys and/or values, performance tuning parameter settings, etc. The additional storage object may be provided with a name that identifies it as a container of information encapsulated for backup (e.g., by including a string such as "SystemState" within the name) in some embodiments, and may be stored in a special location such as a directory hierarchy reserved for encapsulated information containers in such embodiments.

In another embodiment, where the encapsulated information includes configuration information and the backup version of the additional storage object is maintained at a secondary host, the backup manager may be configured to extract at least a portion of the configuration information from the backup version, and use the extracted configuration information to emulate a configuration setting of the primary host at the secondary host. For example, if the configuration information includes information about network file share settings at the primary host, similar network file sharing configurations may be set up at the secondary host using the extracted configuration information. In addition, in response to a restoration request, the backup manager may be configured to regenerate configuration information from the backup version of the additional storage object, and use the regenerated configuration information to set up or configure a restoration target.

Figure 1:
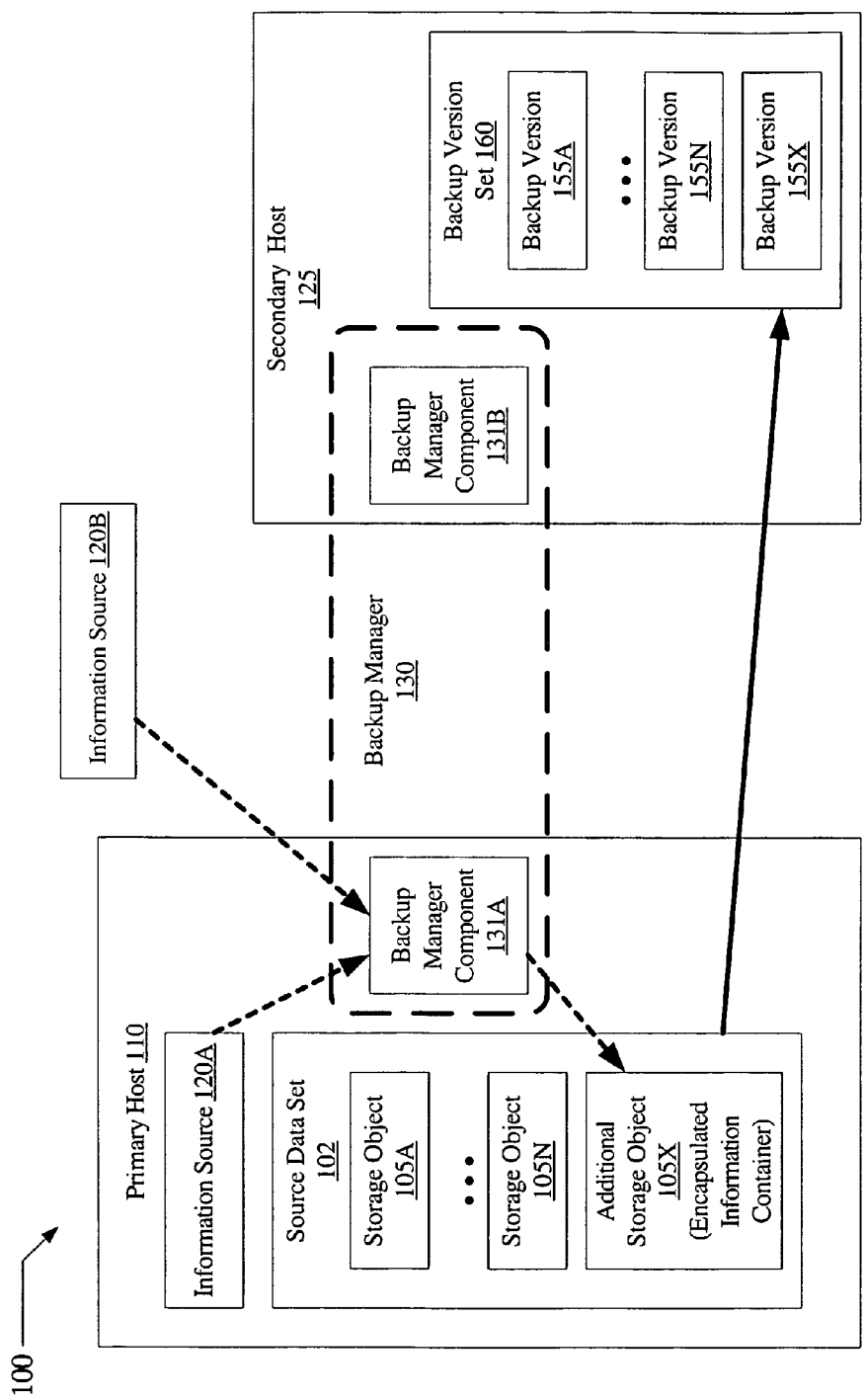
FIG. 1 is a block diagram illustrating one embodiment of a system.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

FIG. 1 is a block diagram illustrating a system 100 according to one embodiment. As shown, system 100 includes a primary host 110 including a source data set 102, a secondary host 125, and a backup manager 130. Backup manager 130 may include backup manager components 131A and 131B at the primary and secondary hosts respectively. Backup manager 130 may be configured to generate backup version set 160 comprising backup versions 155A-155N of primary storage objects 105N (such as files, directories, etc.) of the source data set 102. In addition, backup manager 130 may also be configured to create an additional storage object 105X as a container of information collected from one or more designated information sources 120 (e.g., information source 120A or 120B). The information may be collected in various formats, depending on the information source, and encapsulated within the additional storage object 105X in a particular format suitable for backup. Additional storage objects 105X may also be referred to herein as a "encapsulated information container" objects. A variety of different types of information may be included within storage object 105X in different embodiments, as described below in further detail, including configuration information associated with the primary host 110 such as system state information, network file share information, etc., information generated by one or more applications, arbitrary user-supplied information to be included in backup version set 160, etc. In some embodiments, the backup manager may be configured to request one or more applications and/or users to supply at least a portion of the information to be encapsulated. Some of the information may be obtained from one or more sources 120A within the primary host, and other information may be obtained from one or more sources 120B outside the primary host (e.g., an external source providing network-related configuration information). In some embodiments, backup manager 130 may be configured to select the specific types of information to be included within additional storage object 105X in response to user input (e.g., via parameter files or a graphical user interface), while in other embodiments, backup manager 130 may be configured to automatically select and gather the information without explicit user input. The creation of the additional storage object 105X may be triggered by a detection of a specific condition in some embodiments, as also described below in further detail.

The information may be obtained or collected by backup manager 130 in various formats using any appropriate interface—e.g., in responses to one or more system calls, system registry lookups, network database queries, in response to input received via a user interface, etc. For example, in one embodiment, storage object 105X may be stored in the form of a file or a collection of files accessible to, and recognized by, a file replication engine. In one embodiment, a user may request backup manager 130 to back up arbitrary unstructured information supplied by the user, and backup manager 130 may include the arbitrary unstructured information within storage object 105X. Backup manager 130 may be configured to include the additional storage object 105X within source data set 102, and to generate a backup version 155X of the additional storage object, in addition to the backup versions of the original contents of the source data set. In this way, configuration information and/or other unstructured information may be gathered from a variety of potentially uncoordinated sources, encapsulated into an appropriately-formatted storage object, and protected from failures that may occur at the primary host 110. The encapsulated information, such as configuration settings of the primary host 110, may be recovered from the backup version 155X of the additional storage object as needed.

The term "storage object", as used herein, may refer to any collection of one or more data items for which backup and restore functionality may be desired, such as one or more individual files, file systems, directories (which may also be termed "folders"), logical volumes, database entities such as tablespaces, tables or indexes, etc. Backup version set 160 associated with source data set 102 may be generated and/or maintained using any of a variety of backup techniques in different embodiments, such as various types of replication (e.g., synchronous or asynchronous replication), snapshot or frozen image creation techniques, etc. The primary storage objects 105 as well as their backup versions 115 may be stored on any suitable physical storage devices, such as individual disks, disk arrays, storage appliances, intelligent disk arrays, tape-based devices, and the like in various embodiments. Source data set 102 may be accessible from primary host 110 either directly (e.g., via a protocol such as SCSI (Small Computer Serial Interface)) or via a network such as an IP (Internet Protocol) based network, a fibre channel link, etc. Similarly, backup version set 160 may be accessible from a secondary host 125 either directly or via a network. In some embodiments, portions of storage objects 105 may be backed up directly from volatile storage at the primary host 110, e.g., without requiring backup manager 130 to access disk or tape storage at the primary host. In some embodiments, the backup versions 115 may be made accessible to end-users: for example, end-users may directly access the backup versions 115, and/or restore storage objects 105 from their respective backup versions 115, without the help of backup administrators. In one specific embodiment, the source data set 102 and the backup version set 160 may both be stored at storage devices accessible from the primary host 110, e.g., backup may be performed from one set of storage devices to another without the need for involvement of a secondary host 125.

Figure 2:
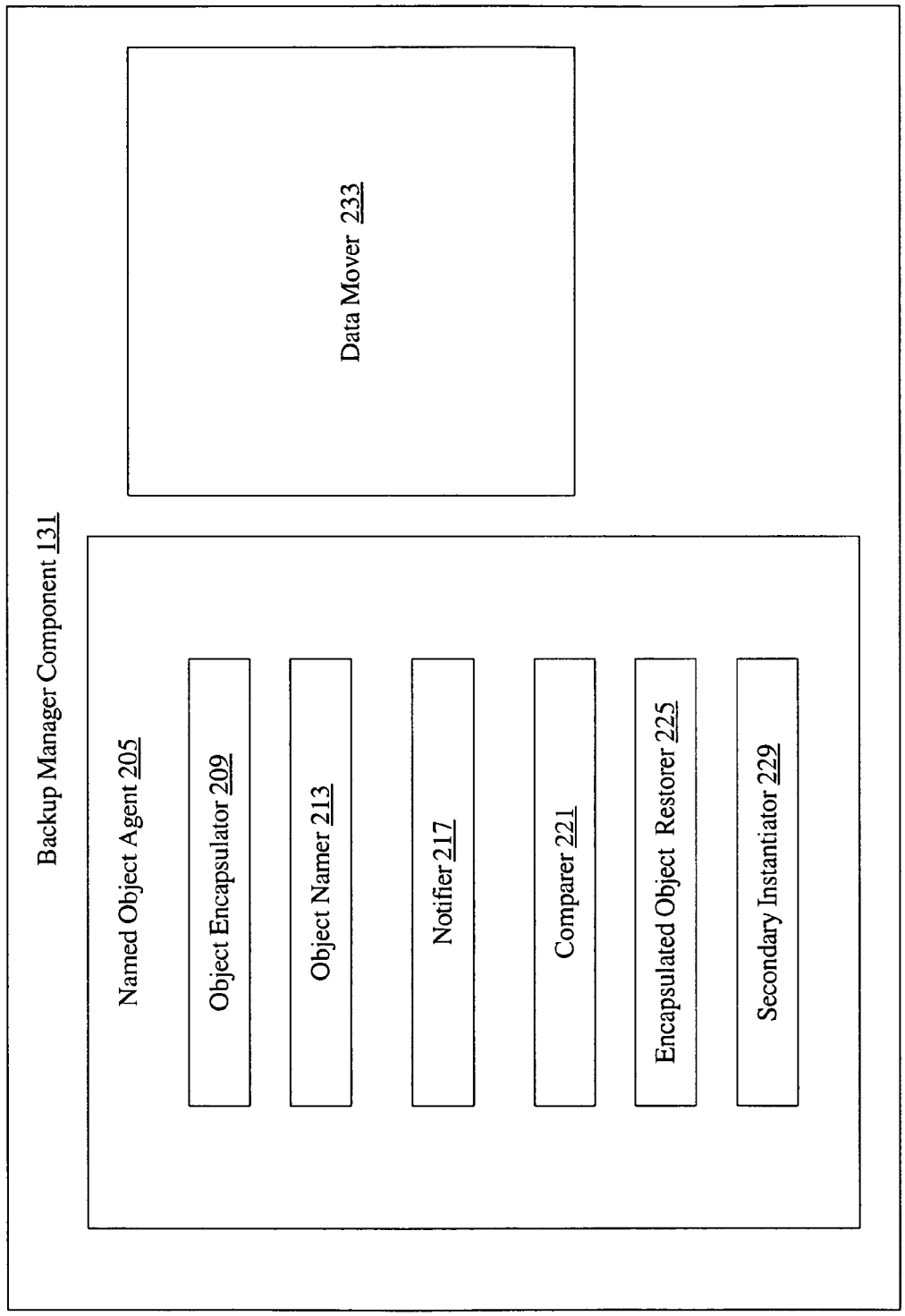
FIG. 2 is a block diagram illustrating exemplary constituent subcomponents of a backup manager component, according to one embodiment.

FIG. 2 is a block diagram illustrating exemplary constituent subcomponents of a backup manager component 131 (e.g., backup manager component 131A or 131B of FIG. 1), according to one embodiment. As shown, the backup manager component 131 comprises a named object agent 205 and a data mover 233. The named object agent 205 may be configured to gather and encapsulate the information to be included within the encapsulated information container object 105X in a desired format. The data mover 233 may be configured to generate the backup version 115X of the encapsulated information container object 105X, e.g., by file-level replication.

As shown in FIG. 2, in one embodiment the named object agent 205 may include several subcomponents, such as an object encapsulator 209, an object namer 213, a notifier 217, a comparer 221, an encapsulated object restorer 225, and a secondary instantiator 229. Object encapsulator 209 may be responsible for collecting and packaging the contents of encapsulated information container object 105X. For example, in one embodiment where data mover 233 is configured to support file replication (but may not be capable of backing up non-file data), object encapsulator 209 may be a file generator configured to store the collected configuration information, application-generated information, and/or user-generated information from one or more designated information sources 120 for backup into one or more files within a file system. The internal organization of encapsulated information container object 105X may vary in different embodiments—for example, in some embodiments, the encapsulated information may be stored in human-readable format (e.g., as (name, value) pairs), while in other embodiments, the encapsulated information may be stored in encrypted and/or compressed format.

Object encapsulator 209 may be triggered to generate encapsulated information container object 105X in a variety of ways in different embodiments. For example, in one embodiment, the creation of encapsulated information container object 105X may be triggered by an event detected by object encapsulator 209, such as a start of a backup job (e.g., an initiation of backup operations for a subset or all of the source data set 102). In such an embodiment, a new encapsulated information container object 105X may be created corresponding to each backup job. In another embodiment, object encapsulator 209 may be configured to monitor one or more sources of information 120 (e.g., source 120A or 120B of FIG. 1), e.g., for changes to configuration information to be collected for backup. In one implementation of such an embodiment, object encapsulator 120 may be configured to poll the one or more sources for changes, e.g., by issuing one or more system calls provided by an operating system at fixed intervals, or by periodically retrieving information from specified sections of a configuration database such as a Windows registry. In some embodiments, object encapsulator 209 may be configured to operate on a schedule, e.g., to generate new encapsulated information container objects 105X after specified time intervals. In one implementation where a schedule-driven object encapsulator 209 is used to collect configuration information, a new encapsulated information container object 105X may be created according to the schedule even if no changes to the underlying configuration information have occurred since the previous time at which configuration information was gathered, while in another implementation, a new version of additional storage object 105X may be generated (or retained after generation) only if at least some of the configuration information has changed. Schedule-based collection and encapsulation of configuration information may be particularly useful, for example, in environments where it may be difficult to monitor for changes to the configuration information.

The sources from which object encapsulator 209 is to gather information may be determined or designated using a variety of techniques in different embodiments. In one embodiment, backup manager 130 may include an administration interface through which users may specify the specific types and/or sources of information that is to be gathered. For example, in one implementation, a graphical user interface or GUI of the administration interface may display a set of candidate types and/or sources of configuration information (e.g., "System State", "Network File Shares", etc.) and/or other information, and a user or administrator may select the desired types and/or sources. In another implementation, an interface such as a parameter file or a set of application programming interfaces (APIs) may be provided for users to specify desired sources of information and/or the specific techniques to be used to gather the desired information. Users may also supply additional information (e.g., a name and parameters of a storage management operation command such as a snapshot creation command associated with source data set 102) that is to be included within encapsulated information container object 105X for backup in some embodiments. In some embodiments, backup manager 130 may be configured to request one or more applications, such as an e-mail server or database application, to provide information to be included in a backup version set 160. The application-generated information may then be encapsulated by backup manager 130 in a format suitable for backup and stored within the source data set 102.

In embodiments where the encapsulated information includes configuration information, object encapsulator 209 may use any of a variety of techniques to collect the configuration information to be encapsulated in different embodiments. For example, in one embodiment, configuration information related to network file shares (e.g., directories or storage devices that are to be shared by more than one host over a network) may be collected using one or more functions or system calls provided by an operating system or network manager software. The specific information collected for each file share may include, for example, the name of the file share, the name and/or network location of the underlying directory that is to be shared, and security information such as a list of users or groups allowed to access the shared directory and the access permissions (e.g., read-only, read-write, etc.) granted to the users or groups.

Configuration information related to system state at the primary host may also be gathered using one or more system calls, and may include, for example in the case of a primary host 110 that is configured to use a version of Microsoft Windows™, a subset of keys and/or values from the Windows registry, a Component Object Model (COM) or COM+ database, license keys for various software and/or hardware products or components in use at the primary host 110, system protected files, etc. At least a portion of the system state information collected may be information that is used during system initialization or boot operations in some implementations. In some embodiments, an operating system in use at the primary host 110 may provide one or more special interfaces specifically provided for collecting system state information, e.g., for collecting sufficient information to allow the primary host to be restored in the event of a catastrophic failure, and object encapsulator 209 may be configured to use such special interfaces to collect configuration information. In other embodiments, object encapsulator 209 may invoke one or more third-party tools to gather the desired configuration information. In some embodiments, any set of additional information identified by a user and/or by backup manager 130 as being potentially needed for restoration (such as various registry keys, performance tuning parameter values, etc.), where the additional information is not already stored within the source data set 102 in a format suitable for backup, may be provided to object encapsulator 209 for inclusion within encapsulated information container object 105X.

Object namer 213 may be configured to select a particular name and/or storage location within source data set 102 for the encapsulated information container object 105X, e.g., in order to distinguish storage object 105X from other storage objects 105A-105N of the source data set. In one embodiment, where storage objects 105A-105N are files and/or subdirectories of one or more root directories, encapsulated information container object 105X may be a file stored within a particular directory, where the particular directory may be reserved for containers of information gathered and encapsulated by object encapsulator 209. The name selected for the object 105X (and/or its parent storage object such as a directory) may include a special pattern identifying the storage object as a container of encapsulated information: e.g., a special string such as "BackupConfigInfo" may be included within the name in one implementation. In some embodiments, separate files may be created for different types of encapsulated information, and human-readable string patterns indicative of the contents of the files may be used for at least a portion of the file names, such as "SystemState", "NetworkFileShares", etc.

Additional storage objects 105X may be hidden from, or made inaccessible to, end users in one embodiment. In another embodiment, multiple simultaneous backup jobs or backup sessions may be supported, where each session may include the generation of backup versions for a different source data set or on behalf of a different user. In such an embodiment, object namer 213 may be configured to provide job-specific or session-specific names for additional object 105X. For example, a globally unique identifier (GUID) generated for a particular backup job may be used as part of the name of a directory where an additional object 105X corresponding to that particular job is stored, so that the information gathered for one backup job does not inadvertently get overwritten by or confused with the information gathered for another job.

In some embodiments, a notifier 217 may be configured to notify a backup manager component at a second host when one or more backup-related events complete at a first host. For example, in one embodiment, notifier 217 at primary host 110 may be configured to generate a notification to a secondary instantiator 229 at a secondary host 125 when the creation of encapsulated information container object 105X has been completed at the primary host. The notification may be implemented using any desired notification mechanism in various embodiments, such as a message sent via data mover 233, a network message sent over a network connection set up specifically for such notifications, etc., and may be used to communicate between various subcomponents of backup manager component 131. In one implementation, notifier 217 may be configured to employ data mover 233 to send a special "checkpoint" message to secondary instantiator 229 at the secondary host 125, and the secondary instantiator 229 may be configured to deduce from the contents and/or format of the checkpoint message that the creation of object 105X and/or the corresponding backup version 115X has completed. In some implementations, notifier 217 may also be used for communication between subcomponents of named object agent 205 within the same host, and/or for communication between named object agent 205 and data mover 233 or other elements of backup manager 130. In one implementation, instead of or in addition to notifier 217, data mover 233 may be configured to notify secondary instantiator 229 when backup version 115X has been successfully created.

In response to a notification indicating that the additional storage object containing encapsulated information has been created at the primary host 110, in one embodiment secondary instantiator 229 may be configured to extract at least a portion of the information from a backup version 115X of the encapsulated information container object 105X when the backup version 115X becomes accessible at the secondary host 125. In addition, secondary instantiator 229 may also be configured to use the extracted information to emulate at least one configuration setting of the primary host 110 at the secondary host 125 in some embodiments. For example, in some storage environments, especially where backup version set 160 is stored on disk-based storage devices, end users may be provided access to the backup version set. The end users may sometimes not even be aware of the backup mechanisms in use, and may be allowed to access the backup versions 115 just as they are allowed to access the primary store objects 105. If the primary host 110 had a network file share configured, end users accessing the secondary host 125 may also expect to access the files of the network file share. In some embodiments, secondary instantiator 229 may be configured to emulate some or all of the file sharing configuration of the primary host 110 at the secondary host 125 using information extracted from the backup version 115X. In emulating the primary host's configuration settings, in some implementations secondary instantiator 229 may set up network file shares to access backup versions of the primary host's file shares (i.e., the shared storage at the secondary host may comprise backup versions of the corresponding shared storage at the primary host). In other implementations, network file shares may be set up to the same underlying storage devices at both the primary host 110 and the secondary host 125. In addition to, or instead of, emulating network file share settings, in some embodiments secondary instantiator 229 may be configured to emulate other primary configuration settings at the secondary host, such as performance tunable settings, etc.

In some embodiments where additional storage object 105X includes configuration information, named object agent 205 may be configured to avoid generating new versions of additional storage objects 105X, and/or to minimize the amount of configuration information stored within additional storage devices 105X, based on a comparison of current configuration information with previously gathered and encapsulated configuration information. In some such embodiments, named object agent 205 may optionally include a comparer 221 configured to determine changes, if any, to configuration information collected since the last encapsulated information container object 105X was generated. If no changes have occurred, comparer 221 may determine that no new encapsulated information container object 105X is needed. If only a relatively small fraction of the configuration information has changed since the last time configuration information was backed up, in one embodiment comparer 221 may direct object encapsulator 209 to create an incremental version of encapsulated information container object 105X, which may only include the changes instead of the full set of configuration information. In one implementation, encapsulated information container object 105X may be implemented as a group of files, with one file containing a baseline version of the configuration information, and the remaining files containing incremental changes to the configuration information. In another implementation, the incremental changes to the configuration information may be appended to an existing encapsulated information container object file 105X, and only the appended changes may be duplicated at the secondary host 125 by data mover 233.

In response to a restoration request, backup manager 130 may be configured to restore one or more backup versions 115, and/or to restore configuration settings encapsulated within backup version 115X at a specified restoration target in some embodiments. The restoration target may be the primary host 110, or some other specified host at which the data and/or configuration of the primary host is to be restored. As part of the restoration, encapsulated object restorer 225 may be configured to regenerate configuration information from the backup version 115X, and to set up a configuration of the restoration target in accordance with the regenerated configuration information. For example, the system state of the primary host may be duplicated at the restoration target host, and/or network file shares of the primary host may be set up at the restoration target using the regenerated configuration information. It is noted that in some embodiments, the original configuration settings may not be completely restorable (e.g., if a disk of the primary host is replaced by a different disk with a different storage capacity at the restoration target), and backup manager 130 may be configured to perform a "best-effort" or partial configuration restoration in such cases.

Data mover 233 may be configured to generate backup versions 115 of backup version set 160, including backup version 115X of encapsulated information container object 105X, using any of a variety of different backup mechanisms in various embodiments. For example, data mover 233 may be configured to perform asynchronous or synchronous replication, to use snapshots, or to use any desired combination of replication and snapshot techniques. In some embodiments, data mover 233 may be configured to replicate storage objects at two or more levels of a storage hierarchy as desired, e.g., to replicate file system level components such as files and directories, as well as volume manager level components such as logical volumes. In other embodiments, data mover 233 may be configured to recognize and replicate only file system objects such as files and directories. In one specific embodiment, as described below in further detail in conjunction with the description of FIG. 6, data mover 233 may be configured to replicate individual I/O operations at secondary host 125 as part of a continuous replication process.

In some embodiments, all of the elements illustrated in FIG. 2 may be included within each backup manager component 131 at each primary and secondary host. In other embodiments, not all of the elements illustrated in FIG. 2 may be implemented within each backup manager component 131, e.g., in one embodiment, a secondary instantiator may be omitted from a particular backup manager component 131 at a primary host 110, and in another embodiment, a comparer may be omitted from a backup manager component 131 at a secondary host 125. In addition to the elements illustrated in FIG. 2, in some embodiments backup manager 130 may include additional components, such as a user interface that may be used to select specific types of information to be included within encapsulated information container object 105X as described above.

Figure 3:
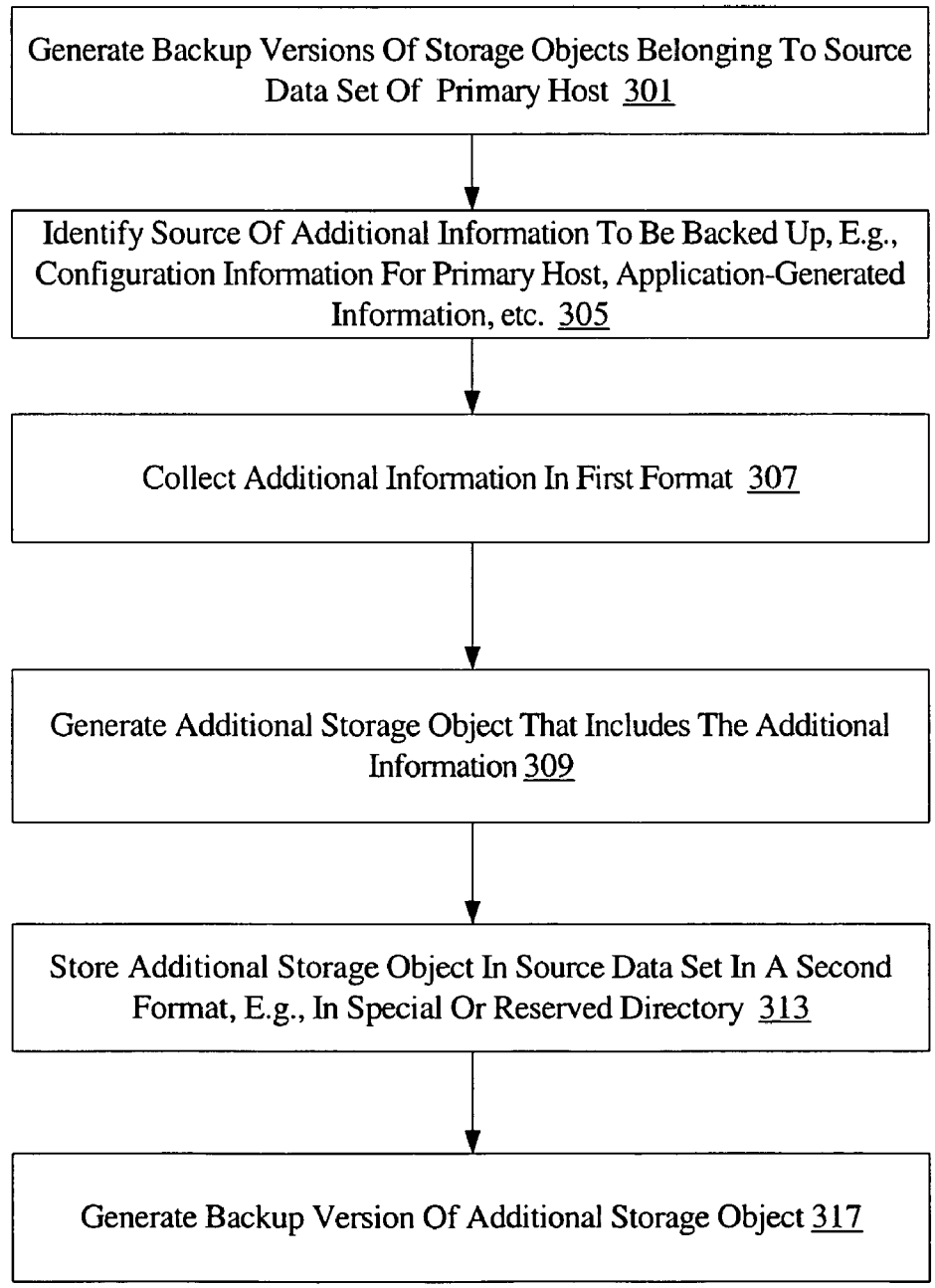
FIG. 3 is a flow diagram illustrating aspects of the operation of a backup manager, according to one embodiment.

FIG. 3 is a flow diagram illustrating aspects of the operation of backup manager 130 according to one embodiment. As shown in block 301 of FIG. 3, backup manager 130 may be configured to generate backup versions 115A-115N of storage objects 105A-105N belonging to source data set 102 of a primary host 110. The backup manager 130 may be configured in some embodiments, for example, to receive as input a list of directory names and/or file names (some of which may include wild card characters and may be used to identify a plurality of files and/or directories) identifying the storage objects 105A-105N that are to be backed up. In one such embodiment, backup manager 130 may be configured to use the specified names to access the set of primary storage objects 105A-105N, and if any of the primary storage objects (e.g., directories) contain other objects (e.g., subdirectories or files), to recursively traverse the storage object hierarchies of the containing objects when generating the backup versions 115A-115N. The backup versions 115A-115N may be generated using a variety of different backup techniques in different embodiments, such as file-level replication (which may be continuous replication or periodic replication, as described below in further detail), snapshot generation, etc. In addition, in some embodiments, backup manager 130 may also be provided a list of sources or types of additional information to be backed up (block 305 of FIG. 3), such as configuration information for the primary host 110, where the additional information may not be stored in a storage format appropriate for backup by the existing backup mechanism. In other embodiments, backup manager 130 may not be explicitly provided a list of sources or types of additional information, but may be configured to automatically collect various types of additional information automatically, i.e., without explicit user input identifying the types and/or sources of information to be collected.

Backup manager 130 (e.g., via one of the subcomponents illustrated in FIG. 2, such as object encapsulator 209) may be configured to collect the additional information from a particular information source 120 in a first format (block 307) and generate an additional storage object 105X that includes the additional information (block 309). The additional storage object 105X may then be stored in the source data set, e.g., in a second format appropriate for backup (block 313). For example, as noted above, in one implementation where data mover 233 (of FIG. 2) is a file replication engine operable to recognize and generate replicas of files for backup, where the replication engine may not be configured to recognize or replicate storage objects other than files or directories, the additional information may be stored in a file storage format recognized by the replication engine. In some embodiments, the additional storage object 105X may be included within the source data set 102 in a specially-named directory that may be reserved for such additional storage objects, as described above in conjunction with the description of object namer 213 of FIG. 2. Backup manager 130 may then generate a backup version 115X of the additional storage object 105X (block 317).

In some implementations, the creation of additional storage object 105X in an appropriate storage suitable for replication, and the inclusion of the additional storage object within the source data set 102 (e.g., by including a directory containing the additional storage object 105X within a parent directory that has already been specified as belonging to the source data set 102 to a replication engine), may lead to an automatic replication of the additional storage object by the replication engine. That is, once object encapsulator 209 and object namer 213 have created the additional storage object 105X and placed it in an appropriate location, data mover 233 may be configured to automatically back up the additional storage object 105X without further interactions with named object agent 205. It is noted that the operations illustrated in FIG. 3 may be performed in a different order than the order shown in FIG. 3, or in parallel, in some embodiments; for example, additional storage objects 105X may be created in parallel with the generation of backup versions 115A-115N in some embodiments where backup manager 130 is multi-threaded, and multiple sets of backup versions 115A-115N may be created before an additional storage object 105X is created. In some embodiments, multiple additional storage objects 105X may be created (e.g., as a set of files in a directory hierarchy, where each file contains a portion of the additional information) and backed up by backup manager 130. It is also noted that in some embodiments, users may request backup manager 130 (e.g., via a GUI or a command line interface) to include arbitrary user-selected collections of data within the additional storage object 105X.

Figure 4:
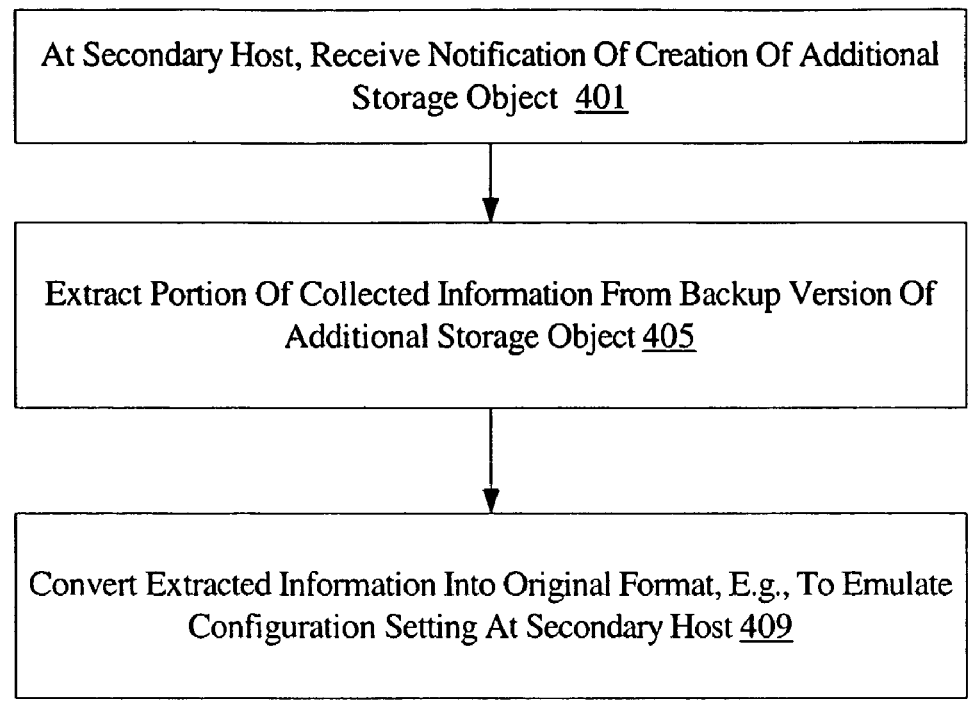
FIG. 4 is a flow diagram illustrating aspects of the operation of a backup manager in response to a notification received at secondary host, according to one embodiment.

FIG. 4 is a flow diagram illustrating aspects of the operation of backup manager 130 in response to a notification received at secondary host 125, according to one embodiment. As noted above in conjunction with the description of FIG. 2, in some embodiments, a notification indicating that the additional storage object 105X has been created may be sent from the primary host 110 to the secondary host 125 (e.g., in the form of a checkpoint message sent by a notifier 217 to a secondary instantiator 229 via a data mover 233). In response to receiving such a notification at the secondary host (block 401 of FIG. 4), in some embodiments a component of backup manager 130 at the secondary host (e.g., secondary instantiator 229 within backup manager component 131B) may be configured to determine whether any action is to be taken. For example, part or all of the encapsulated information included in backup version 115X may be unencapsulated at the secondary host for a variety of reasons. In one embodiment, a backup manager component 131B at the secondary may determine, e.g. based on parameter settings or commands received from a user or an administrator, that one or more configuration settings of the primary host 110 are to be emulated at the secondary host 125 using encapsulated configuration information backed up in backup version 115X. If a network file share "N1" had been set up at the primary host 110, for example, allowing a specified set of users to access a shared storage device "S1" over a network, backup manager component 131B may be configured to set up a corresponding network file share "N2" at the secondary host, allowing the same set of users to access a backup version "S2" of shared storage device over a network from the secondary host 125. In some embodiments, the emulated network file share "N2" may allow users to access the same shared storage device "S1" from the secondary host 125 that was accessible from the primary host 110.

If a configuration setting of the primary host is to be emulated at the secondary host using encapsulated configuration information, the backup manager component 131B may be configured to extract the appropriate configuration information (e.g., the name of the file share, the name and network address of the storage device accessed via the file share, security information identifying users allowed to access the file share, etc., in the case of a network file share configuration setting) from the backup version 115X (block 405 of FIG. 4).

In some embodiments, the extracted information may be converted into its original format, e.g., to emulate the configuration setting at the secondary host (block 409). In one embodiment, encapsulated information that is not configuration information associated with the primary host (e.g., arbitrary user-supplied information or application-generated information) may also or instead be extracted from backup version 115X at the secondary host, e.g., for inclusion within a log or for some application-specific purpose. In some embodiments, the notification received at the secondary host 125 may be indicative of a completion of the generation of backup version 125 instead of being indicative of the completion of the creation of the additional storage object 105X. It is noted that, in addition to or instead of triggering an emulation of a primary host configuration setting at the secondary host, in some embodiments the notification from the primary host may trigger other kinds of operations at the secondary host, such as a generation of an e-mail message to an administrator, etc.

Figure 5:
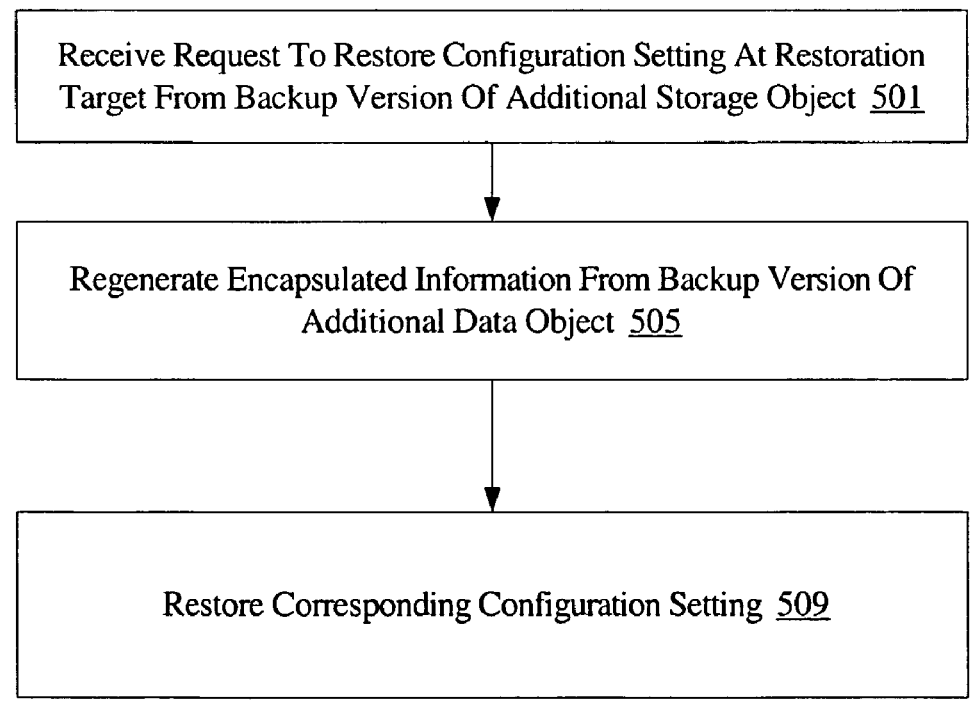
FIG. 5 is a flow diagram illustrating aspects of the operation of a backup manager during restore operations, according to one embodiment.

FIG. 5 is a flow diagram illustrating aspects of the operation of backup manager 130 during restore operations, according to one embodiment where the additional storage object 105 includes encapsulated configuration information. In response to a request to restore a configuration setting from the backup version 115X at a restoration target (block 501 of FIG. 5), backup manager 130 may be configured to extract or regenerate the needed configuration information from the backup version 115X (block 505) (e.g., via an encapsulated object restorer 225 as shown in FIG. 2), and restore the configuration setting (block 509). The restoration target may be the primary host 110 itself, or another host where data and/or configuration of the primary host are to be duplicated. In some embodiments where the restore request is received from a user, backup manager 130 may be configured to ensure that the user has the appropriate authorization privileges (e.g., system administrator privileges) before restoring the configuration setting. In other embodiments where end-users are allowed to initiate restorations of storage objects such as files and directories, e.g., by clicking on an icon representing a backup version of a file or directory within a GUI, backup versions 115X of encapsulated information container objects 105X may only be accessible to administrative users; e.g., icons representing backup versions 115X may not even be visible to non-administrators. In embodiments where information other than configuration settings is included within additional storage objects 105X, backup manager 130 may be configured to restore the other information, e.g., in its original format, at the restoration target, without modifying configuration settings of the restoration target.

Figure 6:
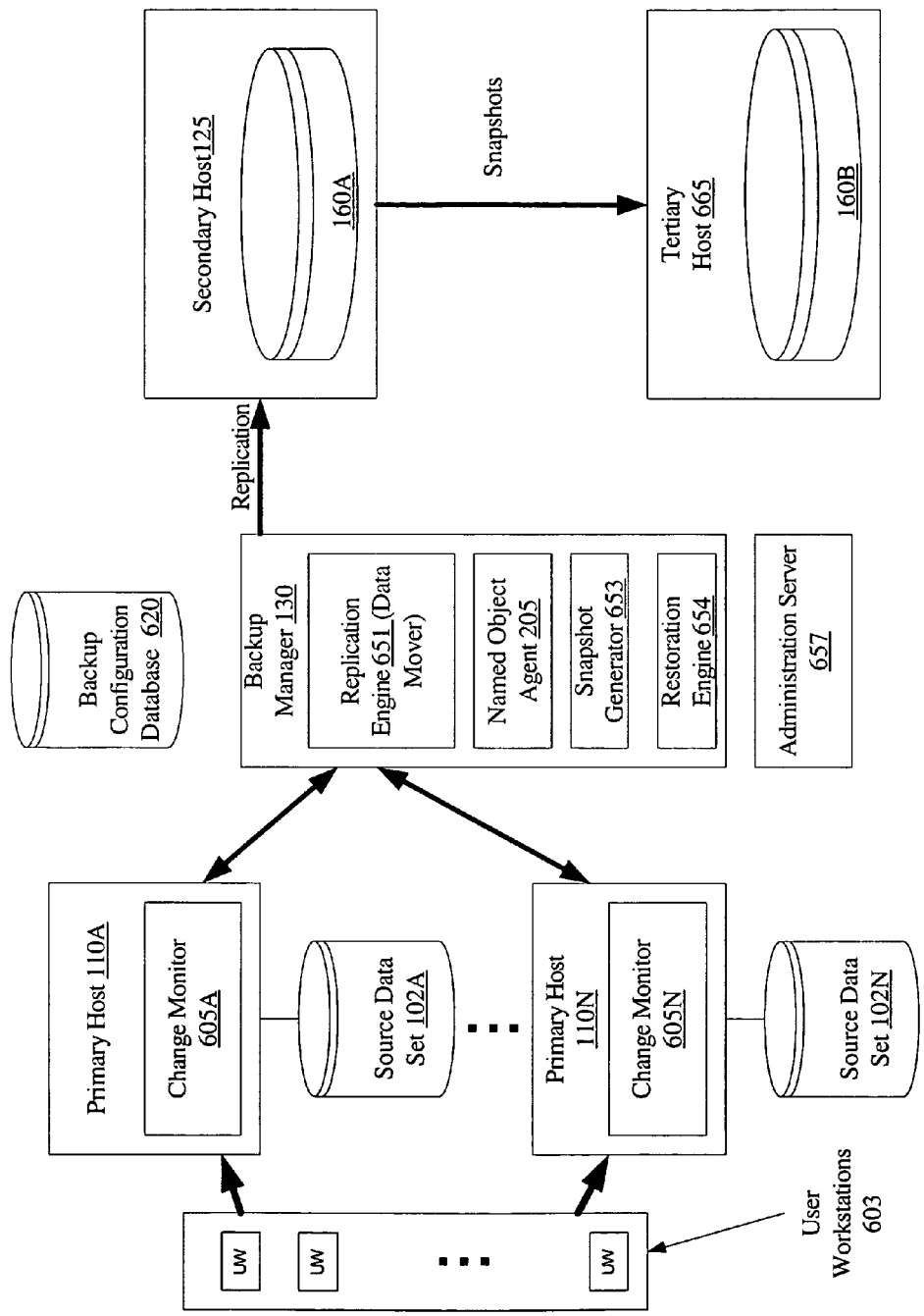
FIG. 6 is a block diagram illustrating an embodiment where a backup manager is configured to generate backup versions of storage objects from a plurality of primary hosts at a secondary host, according to one embodiment.

FIG. 6 is a block diagram illustrating an embodiment where backup manager 130 is configured to generate backup versions at secondary host 125 from a plurality of primary hosts 110 (e.g., 110A-110N), according to one embodiment. As shown, primary hosts 110A-110N may each include a respective set of source data sets 102—e.g., primary host 110A may include source data set 102A, primary host 110N may include source data set 102N, etc. The source data sets 102 may represent data of various applications being executed, for example, on behalf of a plurality of users at user workstations (UW) 603. In one embodiment, for example, one of the applications being supported by one or more primary hosts 110 may be an on-line banking service, or an Internet auction service. As input from the user workstations is received, corresponding data transactions may be initiated, which may result in updates to storage objects within source data sets 102.

As described earlier, various components of backup manager 130 may be included within each of the primary hosts, as well as at secondary host 125. Several of the components (such as replication engine 651, named object agent 205, restoration engine 654 and snapshot generator 653) are shown in consolidated form within backup manager 130 in FIG. 6 (the individual components at each host are not shown for clarity). In one embodiment, a replication engine 651 (which may also be configured to perform functionality similar to that of data mover 233 of FIG. 2) within the backup manager 130 may be configured to periodically replicate data from one or more of the primary hosts 110 to secondary host 125. In some embodiments, the replication operations for different source data sets 102 may be scheduled and managed independently of each other. For example, primary host 110A may support a data mining application whose data sets do not change very often, and the source data set 102A may be replicated once every six hours to a particular destination volume at secondary host 125. In the same example, primary host 110N may support an online transaction processing system such as an airline reservation system, whose data is updated fairly rapidly, and the source data set 102N may be replicated once every ten minutes (or via continuous or real-time replication as described below) to the same destination volume or a different destination volume at secondary host 125. To maintain point-in-time copies of the primary application data objects, a snapshot generator 653 may be configured to generate additional backup versions 160B in the form of snapshots, e.g., once every hour, from the secondary host to a tertiary host 665. Tertiary host 665 may also include one or more components of backup manager 130 in some embodiments. The snapshot generator 653 and the replication engine 651 may be configured to perform their respective operations asynchronously with respect to one another, i.e., according to independent schedules. Snapshots may be generated using any of a variety of specific techniques by snapshot generator 653, e.g., using operating system-provided snapshot functionality, volume-level mirroring, space efficient snapshot techniques, or custom hardware snapshot techniques.

In some embodiments, primary hosts 110 may include respective change monitors 605 (e.g., change monitor 605A at primary host 110A, and change monitor 605N at primary host 110N) that may be configured to monitor a specified set of storage objects of a corresponding source data set 102 for changes. In one embodiment, a change monitor 605 may also be configured to perform some of the monitoring functionality of object encapsulator 209 of FIG. 2, i.e., a change monitor 605 may be configured to monitor for changes to configuration information as well as changes to storage objects 105. When changes such as object creations, deletions or modifications are detected, the change monitor may be configured to inform the backup manager 130 (e.g., via a journaling mechanism), and replication engine 651 may be configured to replicate the changes at secondary host 125. In some implementations, replication engine 651 may be configurable to perform replication operations in either direction, as desired—e.g., from primary hosts to secondary hosts, or from secondary hosts to primary hosts.

In one specific embodiment, a change monitor 605 may be configured to detect a variety of I/O operations (e.g., operations to read, write, or modify attributes such as security or ownership attributes of files) performed on the set of primary storage objects 105, and to notify the backup manager 130 of the I/O operation detected. Replication engine 651 may be configured to then replicate the I/O operation at secondary host 125. In this way, changes being made at primary hosts 110 may be very quickly reflected at the secondary host 125—e.g., the state of the backed up versions 115 at secondary host 125 may track the state of the source data sets 102 to within a few seconds or even to within a few milliseconds in some implementations. In one embodiment, configuration changes at the primary host may also be collected by named object agent 205, stored in a format suitable for replication (e.g., in a file), and replicated to the secondary host 125 as soon as they are detected, using the techniques described above. Such a replication process, in which changes being made to the primary data objects and/or configuration are detected and replicated in real time may be termed "continuous replication" or "real-time replication", and the backup manager 130 may be termed a "continuous protection server" in embodiments supporting continuous replication. In some embodiments, changes to storage objects may be replicated continuously, while changes to configuration information may be replicated periodically or according to a schedule. In one embodiment where information other than configuration information is encapsulated in additional storage objects 105, the non-configuration information may also be encapsulated and replicated as soon as it is made available to backup manager 130. Change monitors 605 may be implemented via file system filter drivers in some embodiments, which may be configured to intercept I/O operations as they are executed at the primary hosts 110. In one embodiment, change monitors may be configured to periodically check for changes to data objects, instead of continuously monitoring for changes. In another embodiment, the replication process may include a synchronization of a source data set 102 (e.g., a file system) with a replica at secondary host 125, with the additional capability of monitoring and replicating changes that occur at the source data set after the synchronization begins—that is, both synchronization and continuous replication may be performed by backup manager 130. In some embodiments, backup and restoration operations may be managed in units called jobs.

In embodiments where continuous or real-time replication is supported, an initial period of synchronization between the primary and secondary hosts may be required when replication of a source data set 102 is started, and additional periods of synchronization between the primary and secondary hosts may also be needed from time to time (e.g., if a data at a primary host 110 is restored directly from tertiary host 665 and thus becomes unsynchronized with respect to the replica at the secondary host 125). Configuration information and/or other additional information may also be gathered and appropriately encapsulated by named object agent 205 during such periods of synchronization in such embodiments.

Secondary host 125 may serve as a staging area for backed up data between the primary hosts 110 and tertiary hosts 665 in the embodiment of FIG. 6. In some embodiments, tape devices or optical storage devices such as various types of jukeboxes may be used for tertiary storage, while in other embodiments, the tertiary storage devices may include disks, disk arrays and the like. Backup manager 130 may include a restoration engine 654 in some embodiments, which may be configured to implement restoration operations from secondary host 125 or from tertiary host 665. In such an embodiment, restoration engine 654 may provide a restoration selection interface, e.g., to allow a user and/or administrator to search for and specify identify the storage objects that are to be restored, and/or encapsulated information that is to be restored as described above. In some implementations, the restoration selection interface may be a graphical user interface (GUI), while in other implementations, a command line or text-based interface may be used. In one implementation, a restoration selection interface may include a web page accessible via the Internet and/or an intranet. End users may be allowed to request restoration of storage objects using "user-friendly" names for the objects and/or using content-based search criteria, without, for example, specifying the exact logical paths or physical locations to the object to be restored or to the backup version from which restoration is desired.

Configuration information related to the backup operations, for example including locations of various versions of backed up objects, details of the encapsulated information stored for each source data set 102, etc., may be stored in backup configuration database 620 in one embodiment. In another embodiment, an administration server 657 may provide an interface such as an administrative console to configure and manage backup server 130 and its components, such as named object agent 205, replication engine 651 and snapshot generator 653. Such an interface may be used, for example, to select the types and/or sources of configuration information or other information to be included within additional storage objects 105X. In one embodiment, in addition to backing up primary hosts 1101, backup manager 130 may also be configured to back up data of one or more user workstations 603. In some implementations, any combination of replication engine 651, snapshot generator 653, restoration engine 654 and named object agent 205 may be implemented as independent modules or programs that may be invoked by backup manager 130 as needed.

Figure 7:
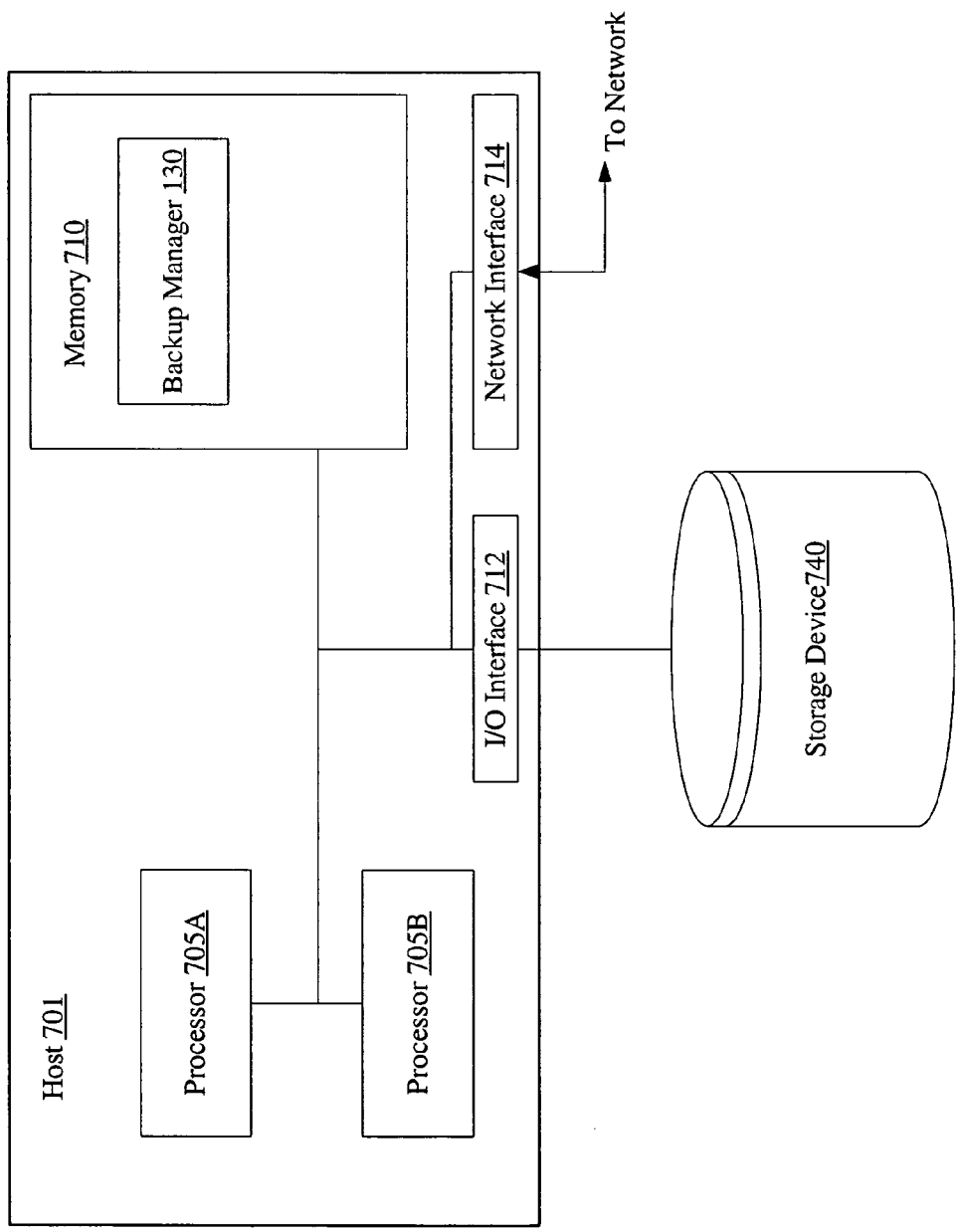
FIG. 7 is a block diagram illustrating constituent elements of a computer host, according to one embodiment.

In various embodiments, as described above, at least a portion of backup manager 130 may be executed at primary, secondary or tertiary hosts. FIG. 7 is a block diagram of a computer host 701 that may be deployed as needed as a primary host 110, a secondary host 125, or a tertiary host 665, according to one embodiment. As shown, host 701 may include one or more processors 705, such as processors 705A and 705B. In various embodiments, processors 705 may be implemented using any desired architecture or chip set, such as the SPARC™ architecture from Sun Microsystems or the x86-compatible architectures from Intel Corporation, Advanced Micro Devices, etc. Program instructions that may be executable to implement part or all of the functionality of backup manager 130 may be partly or fully resident within a memory 710 at a given point in time, and may also be stored on a storage device 740. At least a portion of the additional information (e.g., information that is not typically stored in form suitable for replication or backup), such as configuration information, may be maintained in and collected from memory 740 by backup manager 130 for inclusion in additional storage object 105X in one embodiment. Memory 710 may be implemented using any appropriate medium such as any of various types of RAM (e.g., DRAM, SDRAM, RDRAM, SRAM, etc.). In addition to processors 705 and memory 710, host 701 may also include one or more I/O interfaces 712 providing access to storage devices 740, one or more network interfaces 714 providing access to a network, interfaces to display devices (not shown), and the like. Any of a variety of storage devices 740 may be used to store the instructions as well as data for backup manager 130 and/or the contents of primary storage objects 105 and backup version sets 160 in different embodiments, include any desired type of persistent and/or volatile storage devices, such as individual disks, disk arrays, tape devices, optical devices such as CD-ROMs, CD-RW drives, DVD-ROMs, DVD-RW drives, flash memory devices, various types of RAM and the like. One or more storage devices 740 may be directly coupled to host 701 in some embodiments (e.g., using the Small Computer Systems Interface (SCSI) protocol), or may be accessible over any desired storage interconnect such as a fiber channel fabric or storage area network (SAN) in other embodiments.

In addition to backup manager 130, memory 710 and/or storage devices 740 may also store operating systems software and/or software for various applications such as backup configuration database 620, administration server 657, etc. in various embodiments. In some embodiments, backup manager 130 may be included within an operating system, a storage management software product or another software package, while in other embodiments, backup manager 130 may be packaged as a standalone product. In one embodiment, one or more components of backup manager 130 described above, such as named object agent 205, replication engine 651, snapshot generator 653, and/or restoration manager 654 may be implemented as independent software packages or tools. In some embodiments, part or all of the functionality of backup manager 130 may be implemented via one or more hardware devices (e.g., via one or more Field Programmable Gate Array (FPGA) devices) or in firmware.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A system, comprising:
 a processor; and
 memory coupled to the processor;
 wherein the memory stores program instructions executable by the processor to implement a backup manager configured to:
  generate one or more backup versions of a plurality of storage objects of a source data set of a primary host;
  create an additional storage object, wherein the additional storage object includes information collected from a designated information source in a first format, the first format being a format unsuitable for backup by the backup manager;
  generate a name for the additional storage object, wherein the name includes a pattern identifying the additional storage object as a container of information in a format unsuitable for backup by the backup manager encapsulated for backup;
  store the additional storage object in the source data set in a second format, the second format being a format suitable for backup by the backup manager; and
  generate a backup version of the additional storage object.

2. The system as recited in claim 1, wherein the designated information source includes at least one of: a provider of configuration information associated with the primary host, an application, and a user interface.

3. The system as recited in claim 1, wherein the backup manager comprises a replication engine configured to replicate storage objects that are stored in a particular storage format, and wherein the second format is the particular storage format.

4. The system as recited in claim 1, wherein the backup version of the additional storage object is generated during a generation of a backup version of the source data set.

5. The system as recited in claim 1, wherein the backup manager is configured to create the additional storage object in response to a detection of a triggering condition.

6. The system as recited in claim 5, wherein the information comprises configuration information associated with the primary host, wherein the triggering condition is a change to the configuration information associated with the primary host, and wherein the backup manager is further configured to:

monitor one or more sources of the configuration information associated with the primary host for changes to the configuration information.

7. The system as recited in claim 1, wherein the information includes system state information, wherein at least a portion of the system state information is used during a host initialization process.

8. The system as recited in claim 1, wherein the information includes information indicative of a sharing of a storage device across multiple hosts.

9. The system as recited in claim 1, wherein the backup version of the additional storage object is maintained at a secondary host, wherein the backup manager is further configured to:

extract at least a portion of the information from the backup version of the additional storage object at the secondary host; and emulate a configuration setting of the primary host at the secondary host using the at least a portion of the information.

10. The system as recited in claim 1, wherein the backup manager is further configured to:

store the additional storage object at a location reserved for containers of information encapsulated for backup within the source data set.

11. The system as recited in claim 1, wherein the information comprises configuration information, wherein the backup manager is further configured to:

in response to a restoration request,
regenerate configuration information from the backup version of the additional storage object; and
set up a configuration of a restoration target in accordance with the configuration information regenerated from the backup version.

12. A computer readable medium comprising program instructions, wherein the instructions are computer-executable to implement a backup manager configured to:

generate one or more backup versions of a plurality of storage objects of a source data set of a primary host;

create an additional storage object, wherein the additional storage object includes information collected from a designated information source in a first format, the first format being a format unsuitable for backup by the backup manager;

generate a name for the additional storage object, wherein the name includes a pattern identifying the additional storage object as a container of information in a format unsuitable for backup by the backup manager encapsulated for backup;

store the additional storage object in the source data set in a second format, the second format being a format suitable for backup by the backup manager; and generate a backup version of the additional storage object.

13. The computer readable medium as recited in claim 12, wherein the backup manager comprises a replication engine configured to replicate storage objects that are stored in a particular storage format, and wherein the second format is the particular storage format.

14. The computer readable medium as recited in claim 12, wherein the backup manager is configured to create the additional storage object in response to a detection of a triggering condition.

15. The computer readable medium as recited in claim 14, wherein the information comprises configuration information associated with the primary host, wherein the triggering condition is a change to the configuration information associated with the primary host, and wherein the backup manager is further configured to:

monitor one or more sources of the configuration information associated with the primary host for changes to the configuration information.

16. The computer readable medium as recited in claim 12, wherein the backup version of the additional storage object is maintained at a secondary host, wherein the backup manager is further configured to:

extract at least a portion of the information from the backup version of the additional storage object at the secondary host; and emulate a configuration setting of the primary host at the secondary host using the at least a portion of the information.

17. The computer readable medium as recited in claim 12, wherein the backup manager is further configured to:

store the additional storage object at a location reserved for containers of information encapsulated for backup within the source data set.

18. A method, comprising:

generating one or more backup versions of a plurality of storage objects of a source data set of a primary host;

creating an additional storage object, wherein the additional storage object includes information collected from a designated information source in a first format, the first format being a format unsuitable for backup by a backup manager;

generating a name for the additional storage object, wherein the name includes a pattern identifying the additional storage object as a container of information in a format unsuitable for backup by the backup manager encapsulated for backup;

storing the additional storage object in the source data set in a second format, the second format being a format suitable for backup by the backup manager; and generating a backup version of the additional storage object.

19. The method as recited in claim 18, wherein the one or more backup versions of the plurality of storage objects are created by a replication engine configured to replicate storage objects that are stored in a particular storage format, and wherein the second format is the particular storage format.

20. The method as recited in claim 18, wherein the additional storage object is created in response to a detection of a triggering condition.

21. The method as recited in claim 20, wherein the information includes configuration information associated with the primary host, wherein the triggering condition is a change to the configuration information associated with the primary host, further comprising:

monitor one or more sources of the configuration information associated with the primary host for changes to the configuration information.

22. The method as recited in claim 18, wherein the backup version of the additional storage object is maintained at a secondary host, further comprising:

extracting at least a portion of the information from the backup version of the additional storage object at the secondary host; and emulating a configuration setting of the primary host at the secondary host using the at least a portion of the information.

23. The method as recited in claim 18, further comprising:

storing the additional storage object at a location reserved for containers of information encapsulated for backup within the source data set.

* * * * *